(12) United States Patent
Dao

(10) Patent No.: US 11,221,941 B2
(45) Date of Patent: Jan. 11, 2022

(54) SYSTEMS AND METHODS FOR UNIVERSAL SYSTEM-TO-SYSTEM COMMUNICATION MANAGEMENT AND ANALYSIS

(71) Applicant: JPMORGAN CHASE BANK, N.A., New York, NY (US)

(72) Inventor: Tuan Dao, Richardson, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 28 days.

(21) Appl. No.: 16/702,311

(22) Filed: Dec. 3, 2019

(65) Prior Publication Data

US 2020/0192783 A1    Jun. 18, 2020

Related U.S. Application Data

(60) Provisional application No. 62/780,398, filed on Dec. 17, 2018.

(51) Int. Cl.
| | |
|---|---|
| *G06F 9/44* | (2018.01) |
| *G06F 11/36* | (2006.01) |
| *G06F 8/20* | (2018.01) |
| *G06F 9/54* | (2006.01) |

(52) U.S. Cl.
CPC .......... *G06F 11/3616* (2013.01); *G06F 8/20* (2013.01); *G06F 9/546* (2013.01); *G06F 11/3688* (2013.01); *G06F 11/3692* (2013.01); *G06F 11/3696* (2013.01)

(58) Field of Classification Search
CPC ........ G06F 11/3616; G06F 8/20; G06F 9/546; G06F 11/3688; G06F 11/3692; G06F 11/3696
See application file for complete search history.

(56) References Cited

U.S. PATENT DOCUMENTS

2020/0110691 A1\* 4/2020 Bryant .................. G06F 9/5077
2020/0233790 A1\* 7/2020 Battaglia ............. G06F 11/3672

\* cited by examiner

*Primary Examiner* — Chuck O Kendall
(74) *Attorney, Agent, or Firm* — Greenberg Traurig LLP

(57) ABSTRACT

Systems and methods for universal system-to-system communication management and analysis are disclosed. According to one embodiment, in an analysis engine comprising at least one computer processor, a method for automating architecture design may include: (1) receiving, from an API database, static API information enriched with dynamic usage data; (2) generating a plurality of architecture designs based on the static API information enriched with the dynamic usage data and a plurality of rules, wherein an architect selects one of the plurality of architecture designs; (3) receiving feedback resulting from a simulation of the selected architecture; and (4) heuristically enhancing at least one of the plurality of rules based on the feedback.

14 Claims, 10 Drawing Sheets

SYSTEMS AND METHODS FOR UNIVERSAL SYSTEM-TO-SYSTEM COMMUNICATION MANAGEMENT AND ANALYSIS

RELATED APPLICATIONS

This application claims the benefit of, and priority to, U.S. Provisional Patent Application Ser. No. 62/780,398, filed Dec. 17, 2018, the disclosure of which is hereby incorporated, by reference, in its entirety.

BACKGROUND OF THE INVENTION

1. Field of the Invention

Embodiments are generally directed to systems and methods for universal system-to-system communication management and analysis.

2. Description of the Related Art

Computing systems ranging from mainframes, servers, web browsers to mobile devices communicate to each other using a wide range of methods and application interfaces. It is difficult to analyze, develop, test, automate, and manage them in a holistic and consistent manner.

SUMMARY OF THE INVENTION

Systems and methods for universal system-to-system communication management and analysis are disclosed. According to one embodiment, in an analysis engine comprising at least one computer processor, a method for automating architecture design may include: (1) receiving, from an API database, static API information enriched with dynamic usage data; (2) generating a plurality of architecture designs based on the static API information enriched with the dynamic usage data and a plurality of rules, wherein an architect selects one of the plurality of architecture designs; (3) receiving feedback resulting from a simulation of the selected architecture; and (4) heuristically enhancing at least one of the plurality of rules based on the feedback.

In one embodiment, the plurality of rules may include at least one of security rules, architecture rules, infrastructure rules, and operation rules.

In one embodiment, at least one of the plurality of rules may be a manually-specified rule.

In one embodiment, the simulation may be performed by a smart architecture simulator.

In one embodiment, an architect may provide an adjustment to the selected architecture before the selected architecture is simulated.

In one embodiment, the feedback may include a number of resulting actions coining from an API call, a number of application services or modules required to service an API call, a size of data storage required to service that API call, etc.

In one embodiment, a system for automating architecture design may include an API database storing static API information enriched with dynamic API usage data; a smart analysis engine; and a smart architecture simulator. The API database may provide the smart analysis engine with the static API information enriched with dynamic usage data. The smart analysis engine may generate a plurality of architecture designs based on the static API information enriched with the dynamic usage data and a plurality of rules. The smart architecture simulator may receive, from an architect, a selection of one of the plurality of architecture designs; may simulate the selected architecture design; may receive feedback resulting from the simulation of the selected architecture; and may heuristically enhance at least one of the plurality of rules based on the feedback.

In one embodiment, the rules may include security rules, architecture rules, infrastructure rules, operation rules, etc.

In one embodiment, one of the rules may be a manually-specified rule.

In one embodiment, the simulation may be performed by a smart architecture simulator.

In one embodiment, an architect may provide an adjustment to the selected architecture before the selected architecture is simulated.

In one embodiment, the feedback may include a number of resulting actions coining from an API call, a number of application services or modules required to service an API call, a size of data storage required to service that API call, etc.

According to another embodiment, an API service system may include an API database that receives usage information for a plurality of APIs from a plurality of application; an API validation engine that receives a new API, validates the new API, and translates the new API to a format for the API database; a smart search engine that receives an API query and identifies at least one relationship among a plurality of APIs in the API database; a smart analysis engine that compares or validates at least of the APIs in the API database; a API specification generation engine that generates an API specification for at least one of the plurality of APIs in the API database in a standard format; and an analytics/integrity engine that outputs at least one report based on at least one of API usage, API security, and API governance.

In one embodiment, the smart analysis engine may validate the API in the API database against a third-party API specification.

In one embodiment, the smart analysis engine may output validation results to applications or downstream systems.

In one embodiment, the API validation engine may validate the new API by performing a rule check, a conflict check, a duplication check, a quality check, a revision control check on the new API, etc.

In one embodiment, the API validation engine may identify at least one relationship with one of the plurality of APIs in the API database and stores the relationship. The smart search engine may determine how an API request requires actions or services from another API in the API database or a system.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for universal system-to-system communication management and analysis. In one embodiment, the system may include a platform in which any Application Programmable Interface (API) or communication methods may be translated and stored in a common database in a standardized format. Tests and documents may be automatically generated.

In one embodiment, a smart search engine may facilitate API lookup, and a smart analysis engine may provide a way to collate, compare, and validate API sets against each other. Embodiments may be used as a certification tool.

In one embodiment, a smart analysis engine may provide automated reporting and may build models for designs, such as Domain Driven Design.

In one embodiment, APIs may be rule-checked and validated.

Embodiment may include modular, scalable, intelligent bots that process API data to produce design recommendations, reports, testing, conformance and many other evolving use cases.

Embodiments may record human decisions and may use artificial intelligence (AI) and machine learning (ML) to heuristically and continually increase the quality and effectiveness of future outputs.

In embodiments, may include standardization of APIs, defragmentation, and automated correlation.

In one embodiment, third parties may interface with an external API gateway by making a third-party API request, and the external API gateway may translate or decode the third-party API request using into one or more internal API requests to satisfy the third-party API request.

In one embodiment, a smart search engine may receive a query from API users (e.g., architects, developers, etc.) and may return results (e.g., categorization of APIs, etc.). For example, a merchant may make a call (e.g., get checkout details to retrieve cardholder information (e.g., name, card number, cryptogram, etc.) for a transaction. The API call may be made to an external API gateway, and the external API gateway may translate the merchant's API call to a get wallet internal API call to processing systems, such as a digital wallet system. This may make API calls to, for example, a user profile service to retrieve a cardholder profile, a loyalty service to retrieve a loyalty/rewards point balance, to a payment network partner to retrieve a cryptogram, etc. Thus, the external API gateway receives the API call from the merchant, which results in multiple necessary internal API calls to be made to complete the task.

Figure 2:
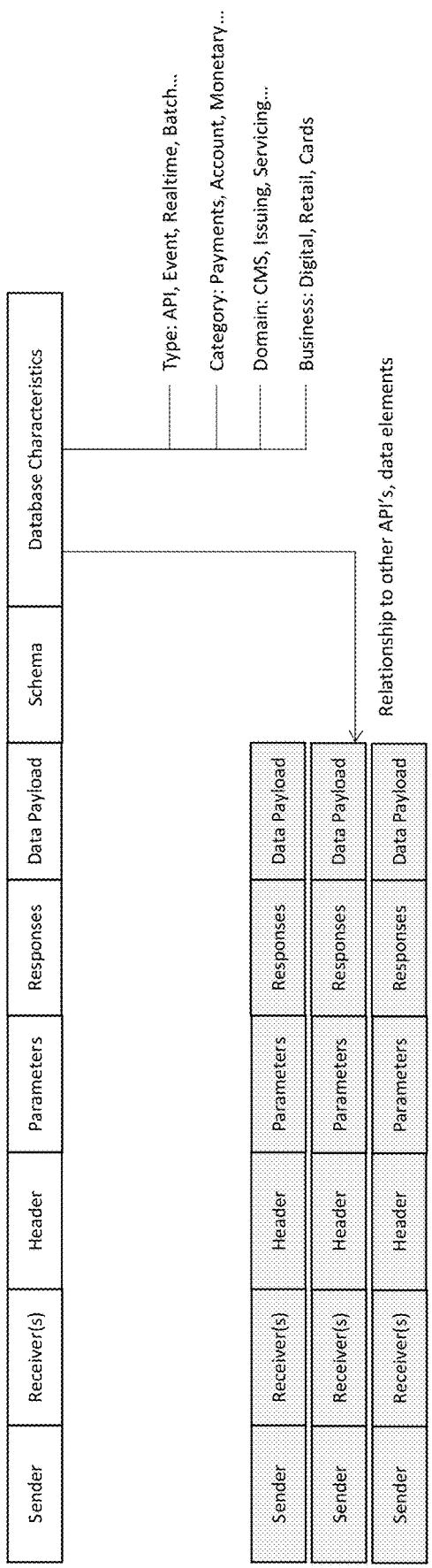
FIG. 2 depicts an exemplary generalized API format according to one embodiment.

Although the term API is used herein, it should be recognized that API encompasses any form of machine-to-machine communication. Examples include RESTful APIs, SOAP APIs, custom APIs, Events, XML APIs, custom APIs, events, batch communication APIs (e.g., file definitions, etc.) etc. For example, FIG. 2 depicts different types of APIs.

Figure 1:
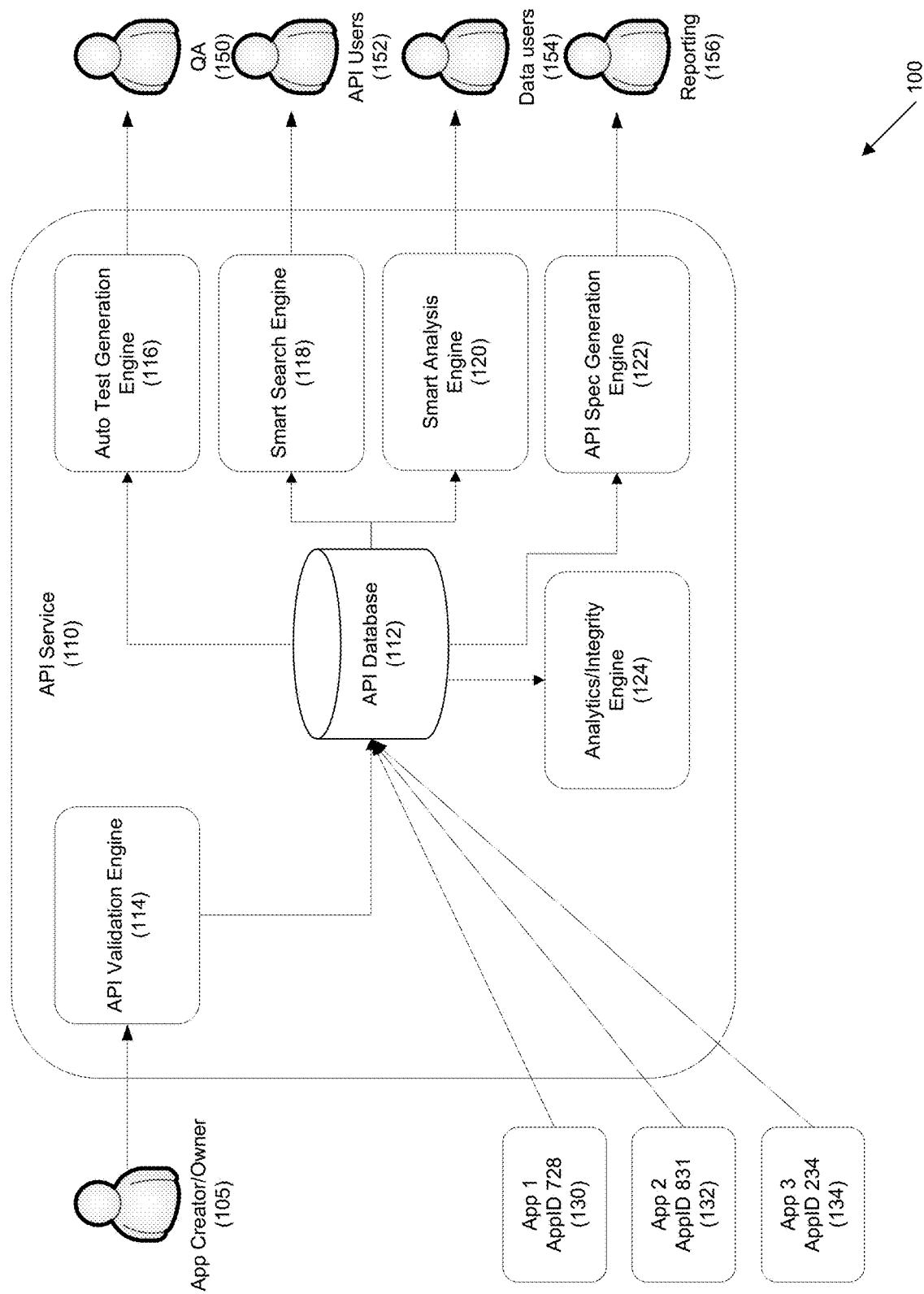
FIG. 1 depicts a system for universal system-to-system communication management and analysis according to one embodiment.

Referring to FIG. 1, a system for universal system-to-system communication management and analysis is disclosed according to one embodiment. System 100 may include API service 110, which may include API database 112, API validation engine 114, auto test generation engine 116, smart search engine 118, smart analysis engine 120, API specification generation engine 122, and analysis/integrity engine 124. API database 112 may receive API usage data from applications (e.g., App 1 130, App 2 132, App 3 134, etc.). For example, whenever an API is used by one of applications 130, 132, 134, the usage may be recorded in API database 112.

App creator/owner 105 may submit a new or updated API to API validation engine 114. API validation engine 114 may validate the API by performing, for example, rules checks, conflicts/duplication checks, quality checks, revision control checks, etc.

An example of an API validation engine, and the API validation process is disclosed in U.S. Patent Application Ser. No. 62/490,176, U.S. Patent Application Ser. No. 62/583,039, and U.S. patent application Ser. No. 15/962,590, the disclosures of each of which are hereby incorporated, by reference, in its entirety.

In embodiment, API validation engine 114 may translate the APIs received into a common format and may enrich the API database 112.

In one embodiment, API database 112 may provide data for, for example, auto test generation engine 116, smart search engine 118, smart analysis engine 120, etc. Auto test generation engine 116 may output test results to QA 150.

Smart search engine 118 may look up the relationships and sequences among all these API calls from the API database. Smart search engine 118 may output results to API users 152, including applications, downstream systems, etc.

Smart analysis engine 120 may compare and/or validate APIs against other API specifications (e.g., partners' API specs). In one embodiment, smart analysis engine 120 may serve to certify an API. Smart analysis engine 120 may output results to data users 154, including applications, downstream systems, etc.

API specification engine 122 may output an API specification in a standardized format for publication for APIs in API database 112. API specification engine 122 may output API specifications to reporting 156, including applications, downstream systems, etc.

Analytics/integrity engine 124 may provide reporting based on, for example, API usage, security, or governance conformance.

FIG. 2 depicts an exemplary generalized API format for API database 112. For example, the API format may include a database characteristics field that may provide information on related APIs, types, category, domain, servicing, etc.

In one embodiment, the database characteristics identify relationships among APIs, mapping of external APIs to internal APIs, etc. For example, when a search is made for one API, other related APIs may be returned. Similarly, when an external API is received, the internal APIs necessary to fulfil the external API may be returned, as well at the sequence in which the APIs should execute, if necessary.

The relationships in the database characteristics are leveraged by the smart search engine and the smart analysis engine. For example, the API validation engine may identify relationships with other existing API and database elements that are already in the API database, and may store those along with the information of the new API provided by the App creator. This allows the Smart Search Engine to look for how one API request requires actions or services from other APIs or systems. This may be used by the smart analysis engine to generate suggested various architecture models.

Figure 3:
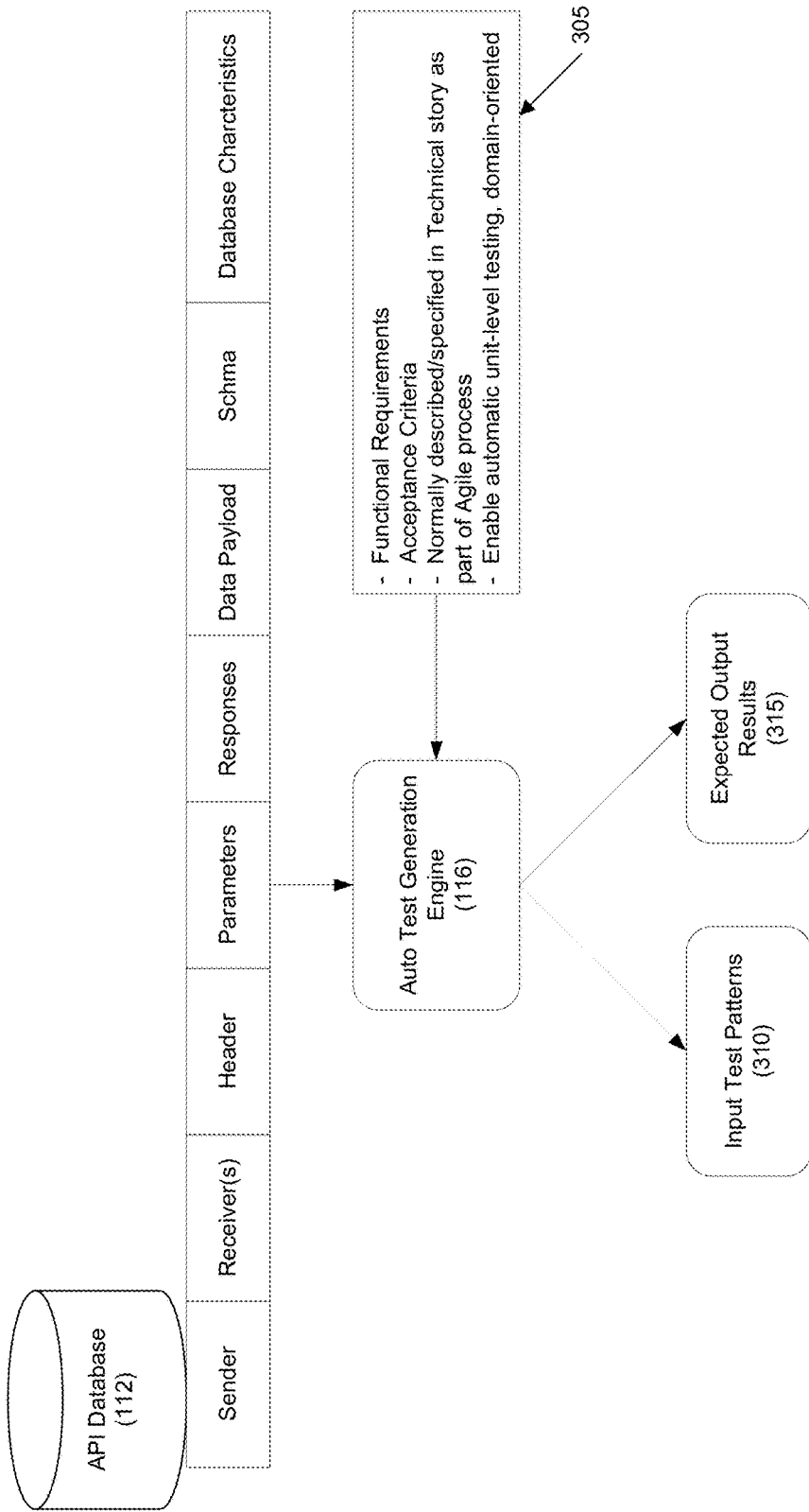
FIG. 3 depicts an auto test generator according to one embodiment.

FIG. 3 depicts an auto test generator according to one embodiment. In one embodiment, using the generalized API format from FIG. 2, auto test generator 116 may receive requirements 305 (e.g., functional requirements, acceptance criteria, etc.) and may output input test patterns 310 and expected output results 315 for testing.

Figure 4A:
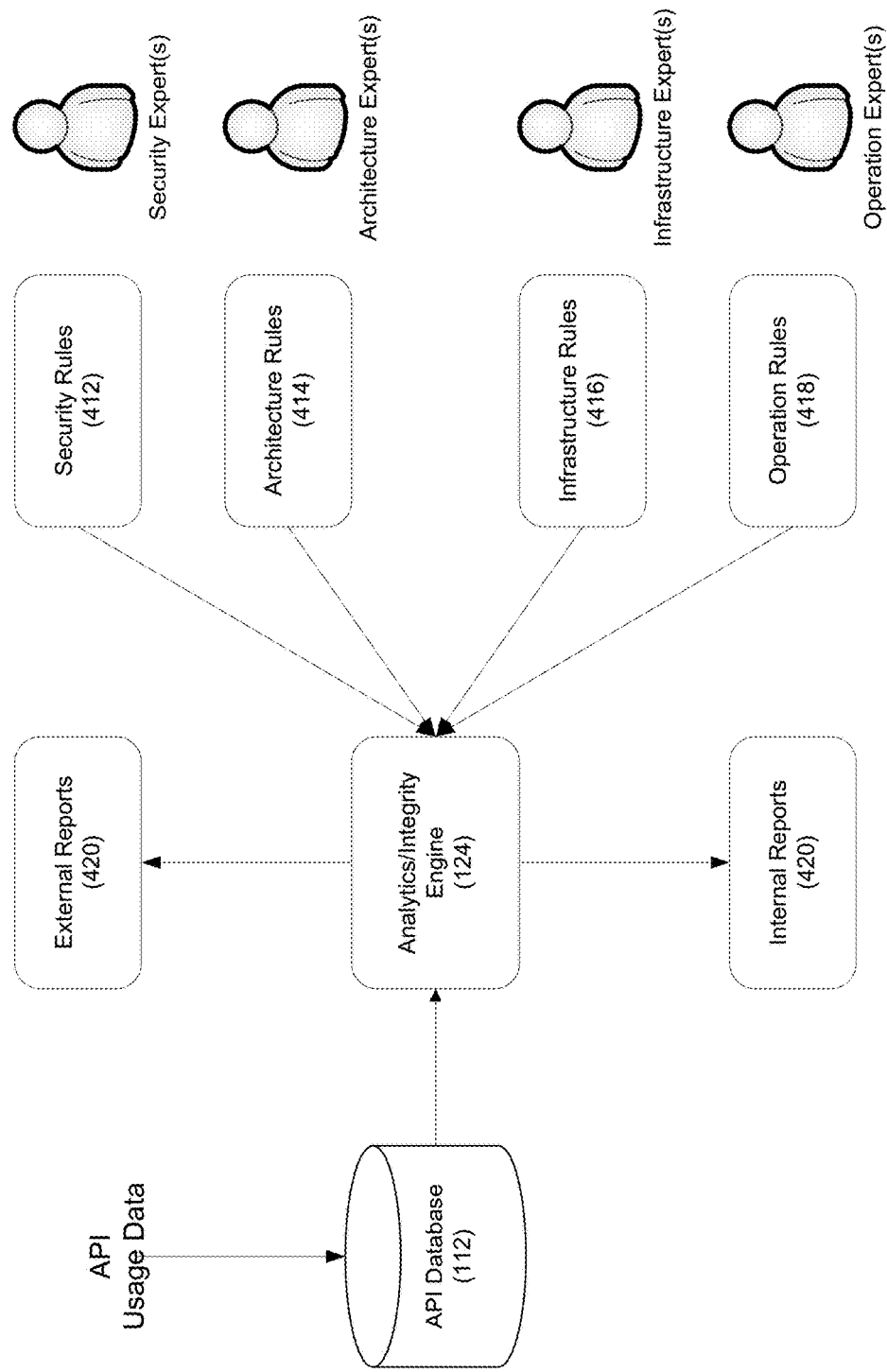
FIGS. 4A and 4B depict an analytics/integrity engine and method of use according to one embodiment.
Figure 4B:
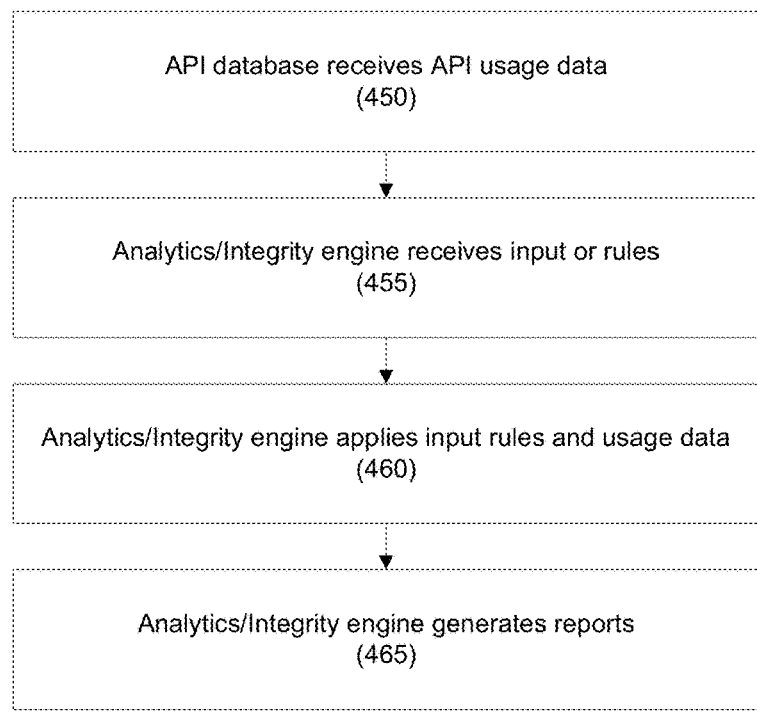

FIGS. 4A and 4B depict an analytics/integrity engine and method of use, respectively, according to one embodiment. Referring to FIG. 4A, analytics/integrity engine 124 may receive input or rules, such as security rules 412, architecture rules 414, infrastructure rules 416, operation rules 418, usage data. etc. and may product internal reports 422 and/or external reports 420.

An example security rule is that the API header should contain authentication and authorization certificates or tokens. An example architecture rule is that responses to an API call should contain proper success/error codes. An example of an infrastructure rule is that the API format should contain server end points in the proper format. An example of an operation rule is that non-mission critical or time-critical API usage should not exceed allowed maximum transactions-per-second.

In one embodiment, rules may be provided from experts. For example, security rules 412 may be provided by security experts, architecture rules 414 may be provided by architecture experts, etc.

Referring to FIG. 4B, in step 450, the API database may receive API usage data, and in step 455, the analytics/integrity engine may receive inputs or rules (e.g., security rules, architecture rules, infrastructure rules, operation rules, etc.). In one embodiment, some or all of these rules may be provided by a human, such as a security expert, an architecture expert, an infrastructure expert, an operation expert, etc.

In step 460, the analytics/integrity engine may apply the input rules and usage data, and in step 465, may generate reports.

Figure 5:
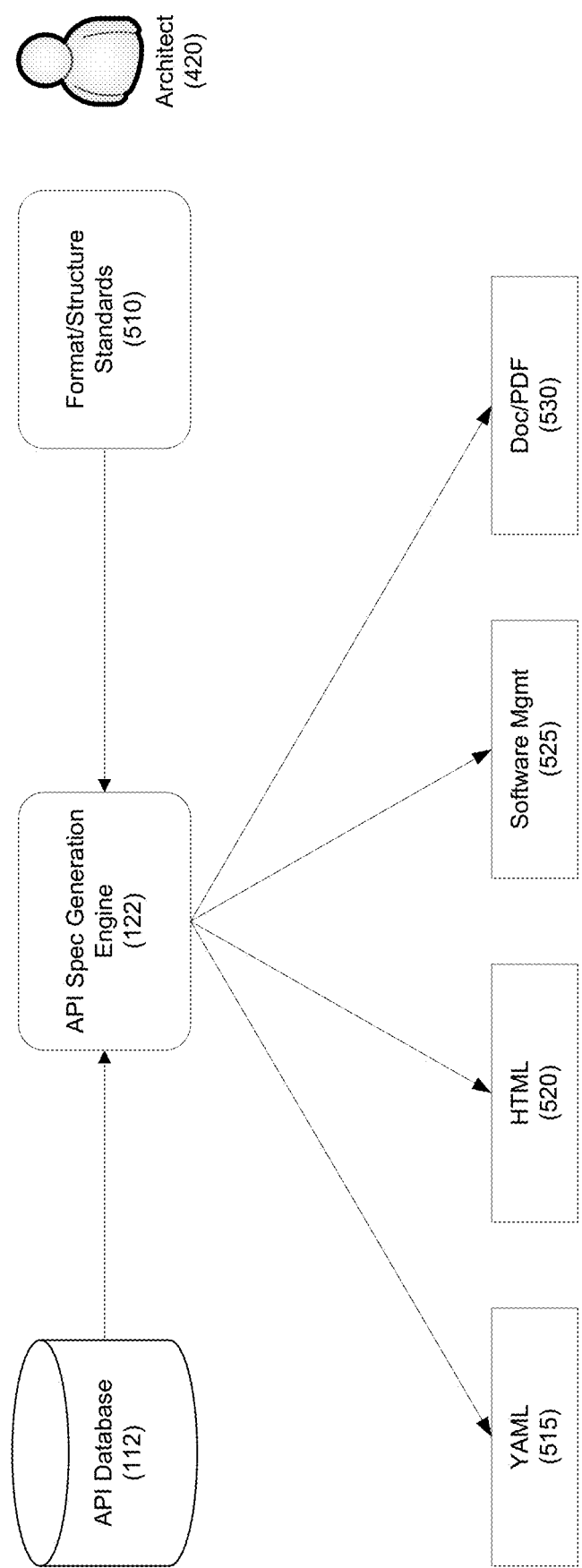
FIG. 5 depicts an API specification generation engine according to one embodiment.

FIG. 5 depicts an API specification generation engine according to one embodiment. For example, API specification generation engine 122 may receive information from API database 112 and/or format/structure standards 510 from architect 420, and may output reports 515, 520, 525, 530. In one embodiment, API specification generation engine 122 may embed security information in reports 515, 520, 525, 530 for controlled distribution.

Figure 6A:
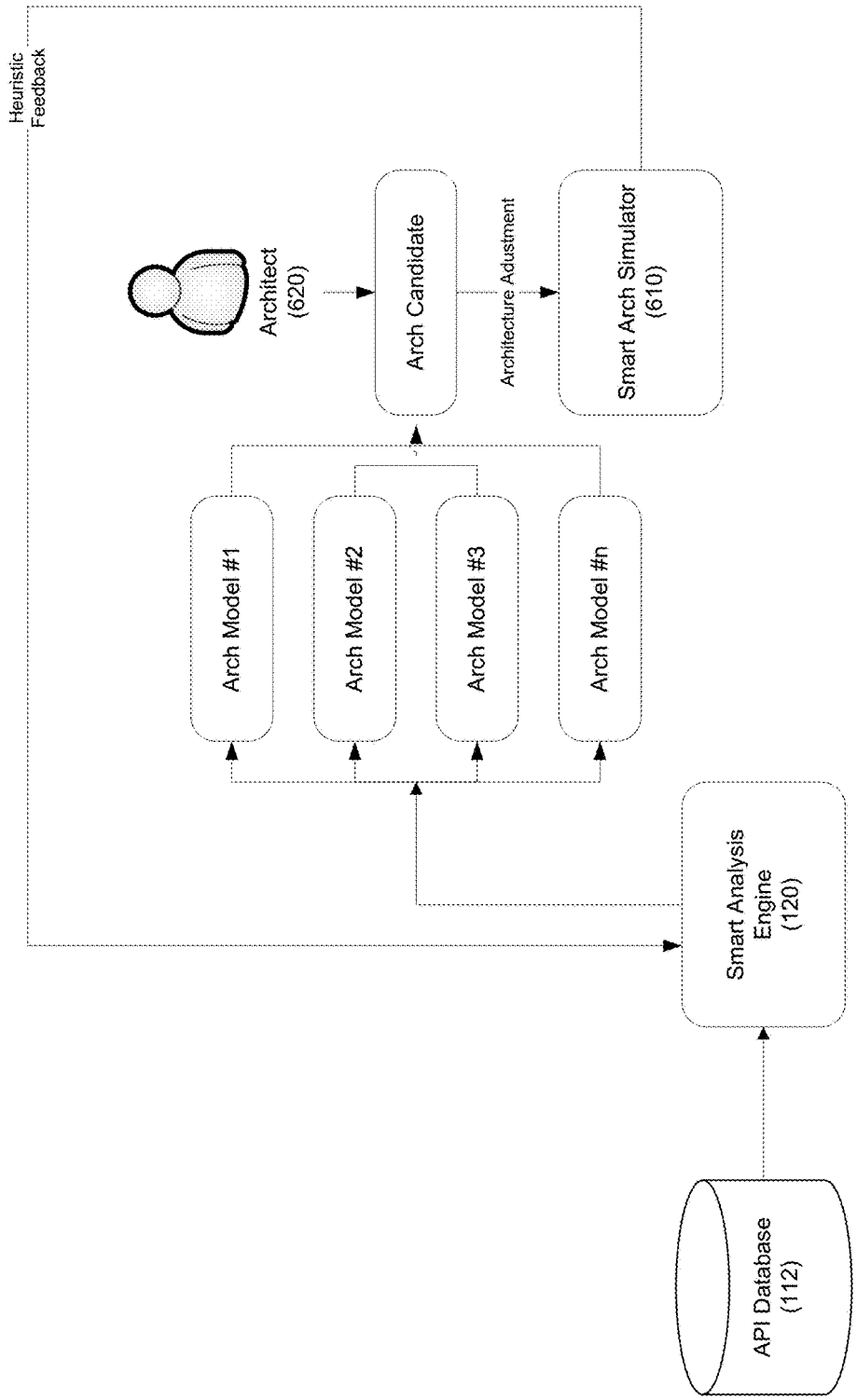
FIGS. 6A and 6B depict a smart analysis engine and method of use according to one embodiment.
Figure 6B:
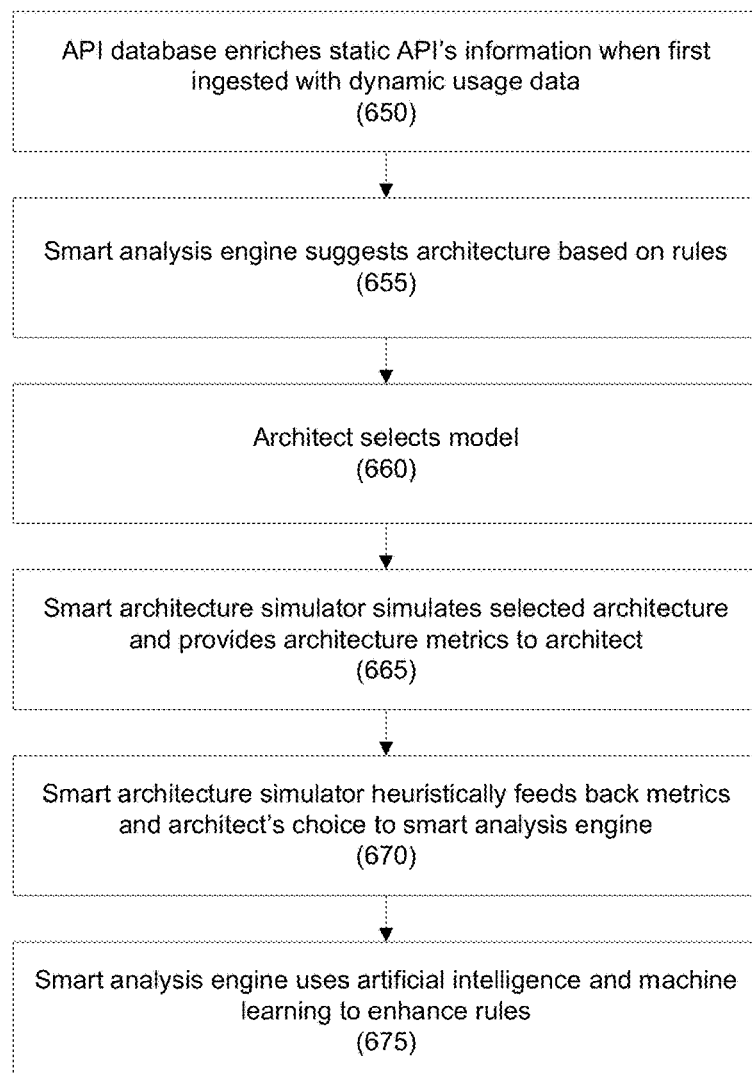

FIGS. 6A and 6B depict a smart analysis engine and method of use, respectively, according to one embodiment. In one embodiment, smart analysis engine 120 may use API database 112 to identify an API functional relationship, a data element relationship, usage patterns, etc.

In one embodiment, smart analysis engine 120 may suggest architecture designs. For example, it may identify bounded context, aggregate, value object, domain event, services, repository, factory, etc. Smart analysis engine 120 may present one or more architectural models (e.g., arch model #1, arch model #2, . . . arch model #n) to architect 620. Architect 620 may provide a model as well.

Architect 620 may select one or more architecture candidates from the architecture models (e.g., arch candidate) and may modify or adjust the architectures as necessary. Smart architecture simulator 610 may then simulate the selected architecture, and may provide feedback and/or metrics to architect 620.

In one embodiment, the accuracy of the simulation may vary depending on the level of modeling, with a more-detailed model providing a more accurate simulation than a less-detailed model.

Smart architecture simulator 610 may further provide feedback to smart analysis engine 120.

Referring to FIG. 6B, in step 650, an API database enriches static API information as first ingested with dynamic usage data.

In step 655, the smart analysis engine may suggest an architecture based on rules (e.g., security rules, architecture rules, infrastructure rules, operation rules, etc.).

In step 660, an architect may select an architecture model, and in step 665, the smart architecture simulator may simulate the selected architecture and provide architecture metrics to the architect. In one embodiment, the architecture metrics that are provided may be defined by humans. Examples include a number of resulting actions coining from an API call, a number of application services (or modules) required to service an API call, a size of data storage required to service that API call, etc.

In step 670, the smart architecture simulator provides heuristic feedback of metrics and the architect's choices to the smart analysis engine. In step 675, the smart analysis engine may use artificial intelligence and/or machine learning to heuristically enhance the human-specified rules based on metrics and architect's choices.

Figure 7A:
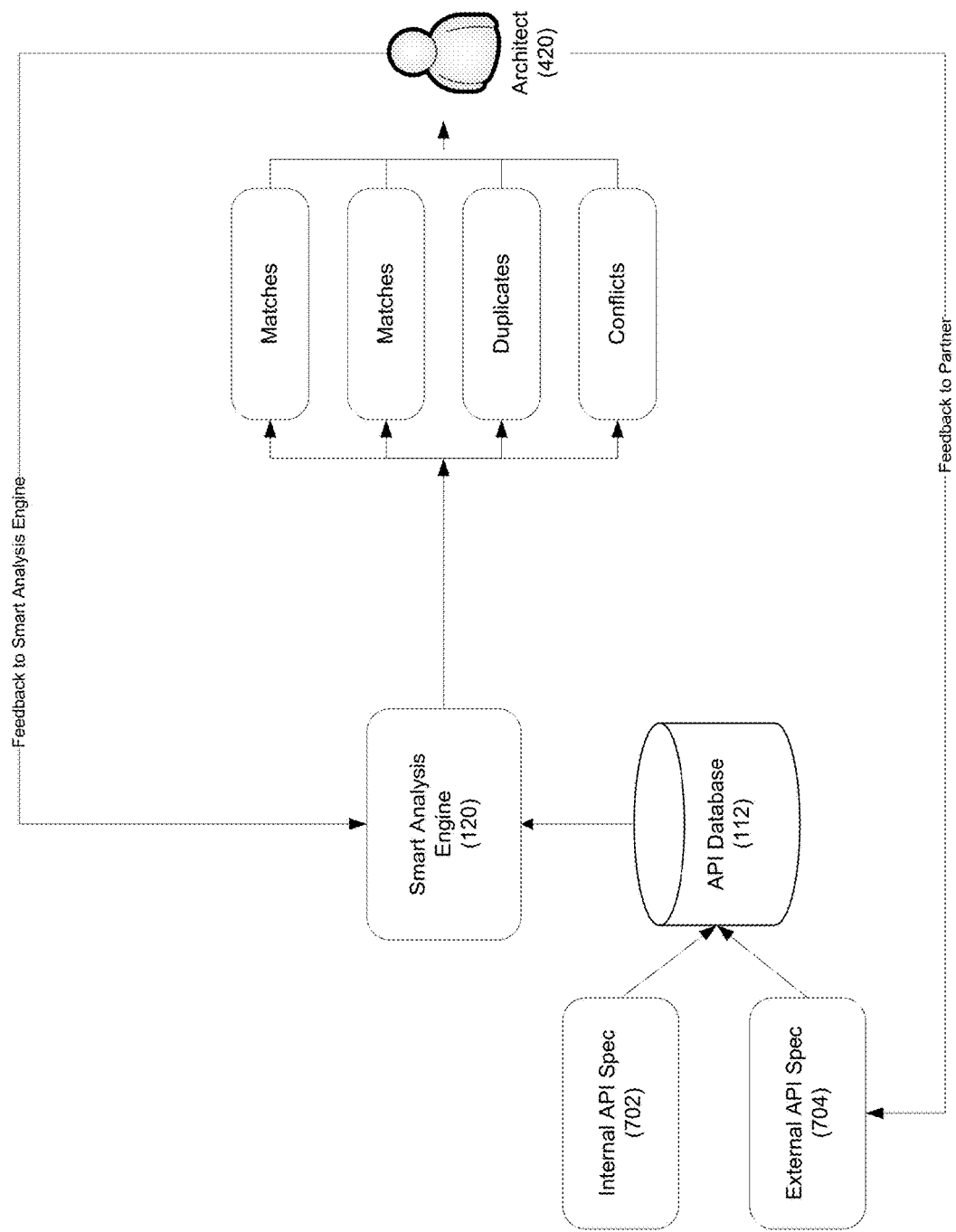
FIGS. 7A and 7B depict a smart analysis engine and method of use according to one embodiment.
Figure 7B:
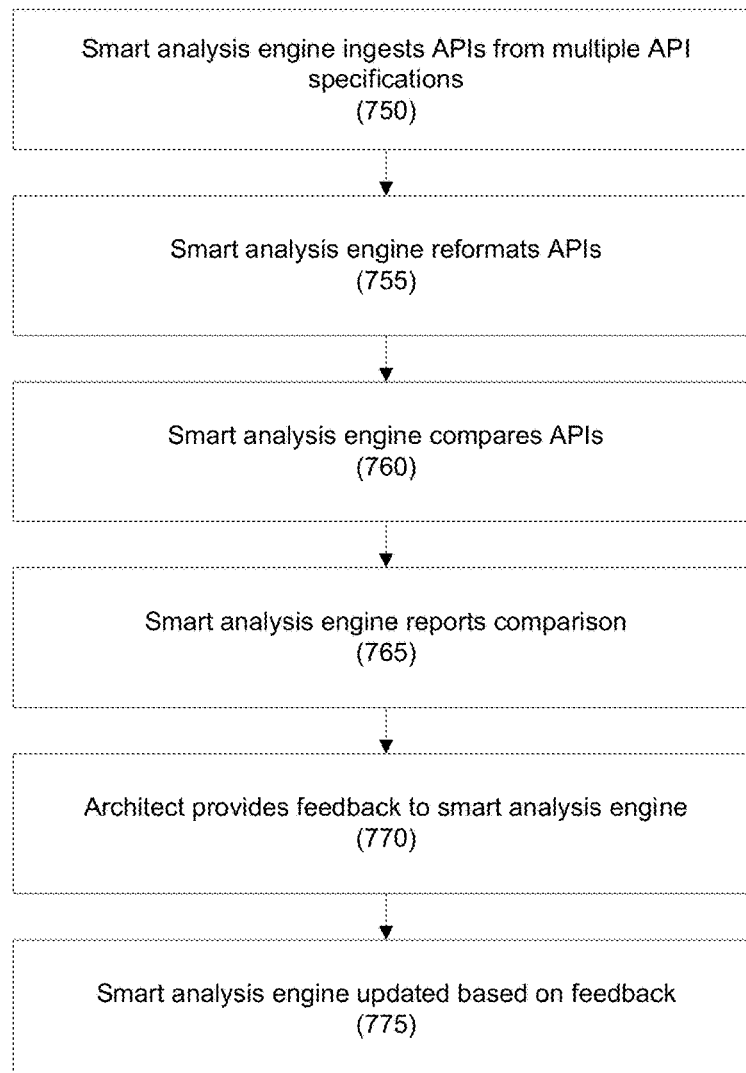

Referring to FIGS. 7A and 7B, a smart analysis engine and method of use, respectively, are disclosed. Smart analysis engine 120 may ingest an API or interface from two or more API specifications (e.g., internal API spec 702 and external API spec 704) and may reformat to the generalized database format in API database 112. Smart analysis engine 120 may identify similarities and discrepancies in the APIs, and may report the integrity of structure and data elements. In one embodiment, the analysis may be used for API conformance and/or certification.

Feedback from the architect 420 may be provided to the smart analysis engine in order to improve the analysis (e.g., using machine learning) and to the API specifications.

Referring to FIG. 7B, in step 750, the smart analysis engine may ingest APIs from multiple API specifications.

In step 755, the smart analysis engine may reformat the ingested APIs for the format used by the API database.

In step 760, the smart analysis engine may compare the reformatted, ingested API to APIs in the API database, and in step 765, may report the comparison.

In step 770, the architecture may review and comparison and may provide feedback to the smart analysis engine. In step 775, the smart analysis engine may be updated based on the architect's feedback.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. An API service system comprising:
   an API database that receives usage information for a plurality of APIs from a plurality of application;
   an API validation engine executed by a first computer processor that receives a new API, validates the new API, and translates the new API to a format for the API database;
   a smart search engine executed by a second computer processor that receives an API query and identifies at least one relationship among a plurality of APIs in the API database;
   a smart analysis engine executed by a third computer processor that compares or validates at least of the APIs in the API database;
   an API specification generation engine executed by a fourth computer processor that generates an API specification for at least one of the plurality of APIs in the API database in a standard format; and
   an analytics/integrity engine executed by a fifth computer processor that outputs at least one report based on at least one of API usage, API security, and API governance.

2. The API service system of claim 1, wherein the smart analysis engine validates at least one of the plurality of APIs in the API database against a third-party API specification.

3. The API service system of claim 1, wherein the smart analysis engine outputs validation results to applications or downstream systems.

4. The API service system of claim 1, wherein the API validation engine validates the new API by performing at least one of a rule check, a conflict check, a duplication check, a quality check, and a revision control check on the new API.

5. The API service system of claim 1, wherein the API validation engine identifies at least one relationship with one of the plurality of APIs in the API database and stores the relationship.

6. The API service system of claim 5, wherein the smart search engine determines how an API request requires actions or services from another API in the API database or a system.

7. The API service system of claim 5, wherein at least two of the first computer processor, the second computer processor, the third computer processor, the fourth computer processor, and the fifth computer processor are the same computer processor.

8. A method for API analysis, comprising:
   receiving, by an API validation engine executed by a first computer processor, a new API;
   validating, by the API validation engine, the new API;
   translating, by the API validation engine, the new API to a format for an API database, wherein the API database stores usage data for a plurality of APIs for a plurality of applications;
   receiving, by a smart search engine executed by a second computer processor, an API query;

identifying, by the smart search engine, at least one relationship among a plurality of APIs in the API database;
comparing or validating, by a smart analysis engine executed by a third computer processor, at least of the APIs in the API database;
generating, by an API specification generation engine executed by a fourth computer processor, an API specification for at least one of the plurality of APIs in the API database in a standard format; and
outputting, by an analytics/integrity engine executed by a fifth computer processor, at least one report based on at least one of API usage, API security, and API governance.

9. The method of claim 8, wherein the smart analysis engine further validates at least one of the plurality of APIs in the API database against a third-party API specification.

10. The method of claim 8, wherein the smart analysis engine further outputs validation results to applications or downstream systems.

11. The method of claim 8, wherein the API validation engine validates the new API by performing at least one of a rule check, a conflict check, a duplication check, a quality check, and a revision control check on the new API.

12. The method of claim 8, wherein the API validation engine further identifies at least one relationship with one of the plurality of APIs in the API database and stores the relationship.

13. The method of claim 12, wherein the smart search engine determines how an API request requires actions or services from another API in the API database or a system.

14. The method of claim 12, wherein at least two of the first computer processor, the second computer processor, the third computer processor, the fourth computer processor, and the fifth computer processor are the same computer processor.

* * * * *